United States Patent
Kamiyama et al.

[11] Patent Number: 6,103,052
[45] Date of Patent: Aug. 15, 2000

[54] PIPE LINING METHOD

[76] Inventors: Takao Kamiyama, 17-2, Toyohara-cho, Hiratsuka-shi, Kanagawa-ken; Yasuhiro Yokoshima, 175-3, Ooaza-Shinoyama, Ishige-cho, Yuki-gun, Ibaraki-ken; Shigeru Endoh, 856, Ooaza-Miyagaski, Yasato-machi, Niihara-gun, Ibaraki-ken; Hiroyuki Aoki, 1-194-4, Hayashi, Tokorozawa-shi, Saitama-ken, all of Japan

[21] Appl. No.: 09/018,069

[22] Filed: Feb. 3, 1998

[30] Foreign Application Priority Data

Feb. 4, 1997 [JP] Japan ................................ 9-021539

[51] Int. Cl.⁷ .................................................. B29C 63/34
[52] U.S. Cl. ...................... 156/253; 156/267; 156/287; 156/294; 138/97; 138/98; 264/269
[58] Field of Search ................................. 156/252, 253, 156/267, 287, 294; 138/97, 98; 264/269

[56] References Cited

U.S. PATENT DOCUMENTS 2,789,934 4/1957 Busbach .
3,950,461 4/1976 Levens .
5,778,937 7/1998 Sundermann .

*Primary Examiner*—Sam Chaun Yao
*Attorney, Agent, or Firm*—Whitham, Curtis & Whitham

[57] ABSTRACT

A pipe lining method is provided for accurately cutting or punching out a pipe liner bag after being lined on an inner wall of a pipe with a good operability while preventing an operation environment from being contaminated. A fluid pressure is applied to act on a pipe liner bag introduced in a pipe to press the pipe liner bag onto the inner wall of the pipe. A thickness reducing member is brought into contact with the outer surface of the pipe liner bag to partially reduce the thickness of the pipe liner bag. A predetermined pipe lining operation with the above state maintained. Then, an external force is applied to a thickness reduced portion of the pipe liner bag to break the portion.

18 Claims, 7 Drawing Sheets

PIPE LINING METHOD

BACKGROUND OF THE INVENTION

1. Field of the Invention

The present invention relates generally to pipe lining techniques, and more particularly, to a pipe lining method for lining a defective or old pipeline with a pipe liner bag for repairing same.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting". When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections.

In the conventional pipe lining method as mentioned above, cutting tools such as sander, a saw, and so on are utilized to manually cut portions of a hardened pipe liner bag which block an inlet and an outlet of a repaired pipe or an opening to a branch pipe.

In particular, since a man cannot enter into pipelines having an inner diameter equal to or smaller than 800 m/m, a remotely operable robot is utilized for cutting a portion of a pipe liner bag, applied to line such a relatively small pipeline, which blocks an opening to a branch pipe. The robot may be controlled on the ground.

However, manual cutting operations of line liner bags utilizing cutting tools cause chips to disperse around the operation site, thus introducing deteriorated operation environment. Particularly, such operations for a sewage line must be performed within a narrow man hole of 900 m/m in diameter, so that the operability is quite low.

In the cutting operation utilizing the robot for piercing a pipe liner bag, in turn, the robot must be remotely operated, so that the robot might damage a branch pipe or a branch pipe liner bag depending on a mounting situation of the branch pipe and a process of operating the robot.

OBJECTS AND SUMMARY OF THE INVENTION

The present invention has been made in view of the problems mentioned above, and it is an object of the invention to provide a pipe lining method which is capable of accurately cutting or piercing a pipe liner bag after applied to a pipeline with a good operability and without causing deteriorated operation environment.

To achieve the above objects, the present invention provides a pipe lining method comprising the steps of:

applying a fluid pressure to act on the inside of a pipe liner bag introduced in a pipe to press the pipe liner bag onto the inner wall of the pipe;

contacting a thickness reducing member on the outer surface of the pipe liner bag to partially reduce the thickness of the pipe liner bag;

performing a predetermined pipe lining operation with the thickness reducing member being maintained in contact with the outer surface of the pipe liner bag; and applying an external force to act on a thickness reduced portion of the pipe liner bag to break the portion.

The pipe liner bag may be comprised of a tubular resin absorbent material impregnated with an unhardened liquid hardenable resin and a highly air-tight film coated over the outer surface of the tubular resin absorbent material. Alternatively, pipe liner bag may comprises tubular thermosetting resin.

The thickness reducing member may be attached to an opening of a branch pipe. Alternatively, the thickness reducing member may be attached to a collar of a branch pipe liner bag. The thickness reducing member is made of metal or hard plastic. Also, the thickness reducing member may be formed with a needle-like notched end, or a convexo-concave end.

The external force applied to the thickness reduced portion of the pipe liner bag may be a blast pressure, a fluid pressure, a volume expanding force generated by frozen water, or an impact caused by a nozzle which advances by a jetting fluid pressure.

Thus, according to the present invention, since the reduced thickness portion cuts into the outer surface of the pipe liner bag to reduce the thickness in a predetermined portion (a portion to be cut or punched) of the pipe liner bag, application of an external force to the thickness reduced portion (a portion having a strength lower than the remaining portion) of the main pipe liner bag results in breaking this portion, whereby the main pipe liner bag is accurately and readily cut or punched along the shape of the thickness reducing member. It is therefore possible to accurately cut and/or punch the main pipe liner bag, after applied to the main pipe, with a good operability, while eliminating deteriorated operation environment and operability which would be otherwise caused by manual cutting operations using conventional cutting tools and remote operations using a robot.

The above and other objects, features, and advantages of the present invention will become apparent from the following detailed description of the preferred embodiments thereof when read in conjunction with the accompanying drawings.

DESCRIPTION OF THE PREFERRED EMBODIMENTS

The present invention will hereinafter be described in connection with several preferred embodiments thereof with reference to the accompanying drawings.

Figure 1:
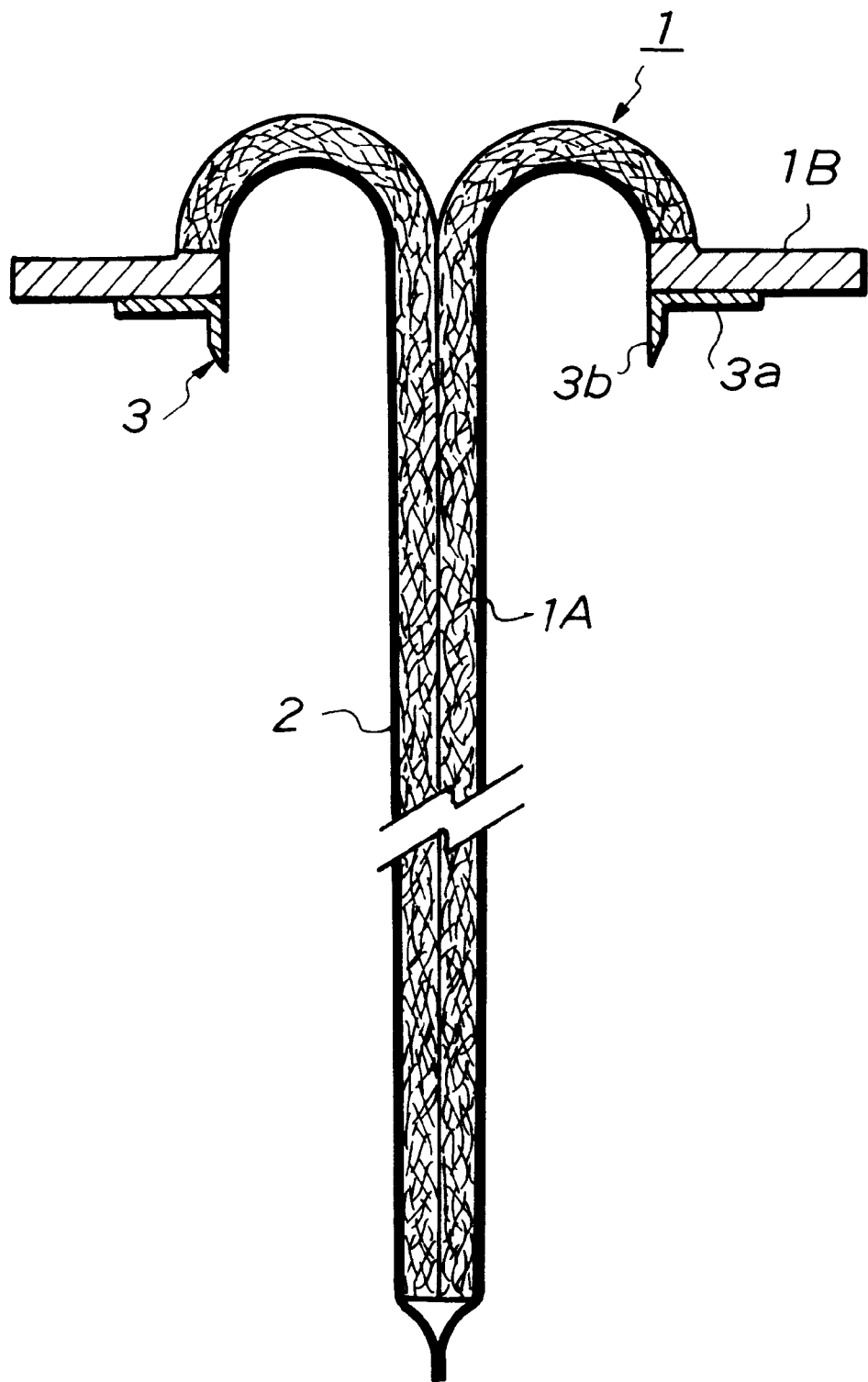
FIG. 1 is a cross-sectional view illustrating a pipe liner bag according to an embodiment of the present invention.
Figure 2:
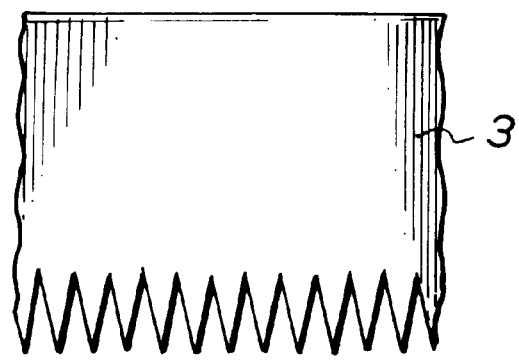
FIGS. 2 and 3 are partial expansion plans each illustrating the shape of an end of thickness reducing members.
Figure 3:
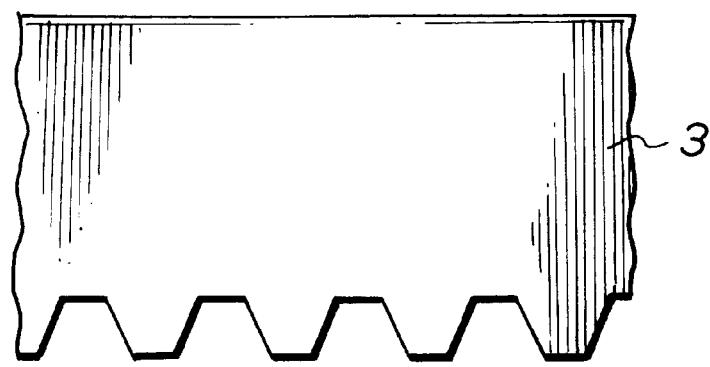

FIG. 1 is cross-sectional view illustrating a branch pipe liner bag according to an embodiment of the present invention, and FIGS. 2 and 3 are partial enlarged views illustrating shapes of ends of reduced thickness members.

A branch pipe liner bag 1 illustrated in FIG. 1 comprises a hardenable resin absorbing portion 1A composed of a tubular resin absorbent material impregnated with an unhardened liquid hardenable resin, one end of which is folded out to form a hard collar 1B, a highly air-tight plastic film 2 coated over the outer surface of the hardenable resin absorbing portion 1A and a portion of the collar 1B which joins the outer surface of the hardenable resin absorbing portion 1A, and a cylindrical thickness reducing member 3 attached on the outer surface of the collar 1B (the lower surface in FIG. 1). It should be noted that an end portion of the hardenable resin absorbing portion 1A of the branch pipe liner bag 1 is air-tight sealed by the plastic film 2.

The tubular resin absorbent material is made of unwoven fabric such as polyester, polypropylene, acrylic, or the like, and used with an unhardened liquid hardenable resin impregnated in the resin absorbent material may be thermosetting resin such as unsaturated polyester resin, epoxy resin, vinyl ester resin, or the like. The plastic film 2 is formed into a single-layer or multi-layer seamless tube by an inflation method, and polyurethane, polyethylene, nylon, ethylene vinyl alcohol, admer, ionomer, vinyl chloride, or the like may be selected as a suitable material therefor.

The collar 1B of the pipe liner bag 1 is formed by folding out one end of the tubular resin absorbent material, impregnating a thermosetting resin such as unsaturated polyester resin, epoxy resin, vinyl ester resin, phenol resin, urethane resin, silicone resin, or the like, and previously hardening the thermosetting resin. The collar 1B is formed in a curved shape substantially equal to the curvature of a main pipe (see FIG. 4), later described.

Further, the thickness reducing member 3 is made of a metal or a hard plastic material, one end of which is formed with a flange 3a in an arc shape matching the configuration of the collar 1B. The thickness reducing member 3 is attached on the outer surface of the collar 1B of the branch pipe liner bag 1 by adhering the flange 3a to the color 1B as illustrated. The inner diameter of a cylinder portion 3b of the thickness reducing member 3 is set to be equal to the inner diameter of the hardenable resin absorbing portion 1A, and an end of the cylinder portion 3b is formed with needle-like notches as illustrated in FIG. 2 or a sharp convexo-concave edge as illustrated in FIG. 3.

Next, the pipe lining method according to an embodiment of the present invention will be described with reference to FIGS. 4–8. FIGS. 4–7 are cross-sectional views illustrating in order various steps of the pipe lining method according to the present invention, and FIG. 8 is an enlarged view illustrating in detail a portion A in FIG. 6.

Figure 4:
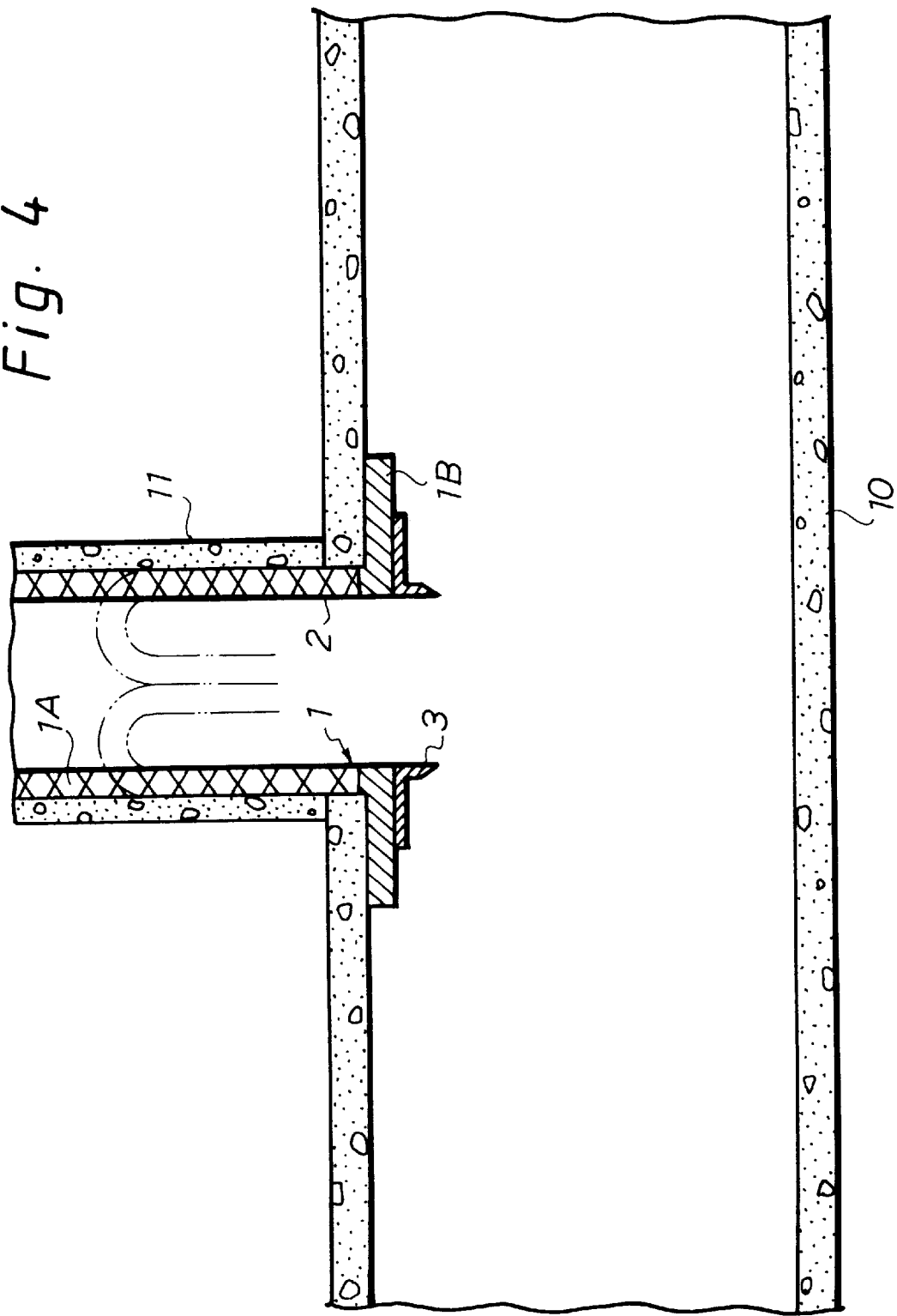
FIGS. 4–7 are cross-sectional views illustrating in order various steps of a pipe lining method according to one embodiment of the present invention.

Referring first to FIG. 4, the pipe lining method according to the present invention first lines a branch pipe 11, connected to a main pipe 10, using the aforementioned branch pipe liner bag 1 and thereafter lines the main pipe 10 using a main pipe liner bag 4, later described, followed by a final piercing operation for piercing a portion 4a (see FIG. 6) of the main pipe liner which blocks an opening to the branch pipe 11.

First, how the branch pipe 11 is lined using the branch pipe liner bag 1 will be described. The branch pipe liner bag 1 is first introduced into the main pipe 10, and applied with a fluid pressure such as air pressure or the like, with its collar 1B being closely attached to the opening of the main pipe 10 to the branch pipe 11, such that the hardened resin impregnating portion 1A of the branch pipe liner bag 1 is everted into the branch pipe 11 upwardly from the main pipe 10 side to the ground.

When the hardenable resin impregnating portion 1A of the branch pipe liner bag 1 has been everted and inserted into the entire length of the branch pipe 11, a fluid pressure is applied to act on the inside of the branch pipe liner bag 1 to press the hardenable resin impregnating portion 1A onto the inner wall of the branch pipe 11. In this state, the hardenable resin impregnating portion 1A is heated to harden the thermosetting resin impregnated therein. In this way, the inner wall of the branch pipe 11 is lined with the hardened branch pipe liner bag 1, thus achieving the repair of the branch pipe 11.

Upon completing the lining of the branch pipe 11, the thickness reducing member 3 attached to the collar 1B of the branch pipe liner bag 1 protrudes toward the main pipe 10, as illustrated in FIG. 4.

Figure 5:
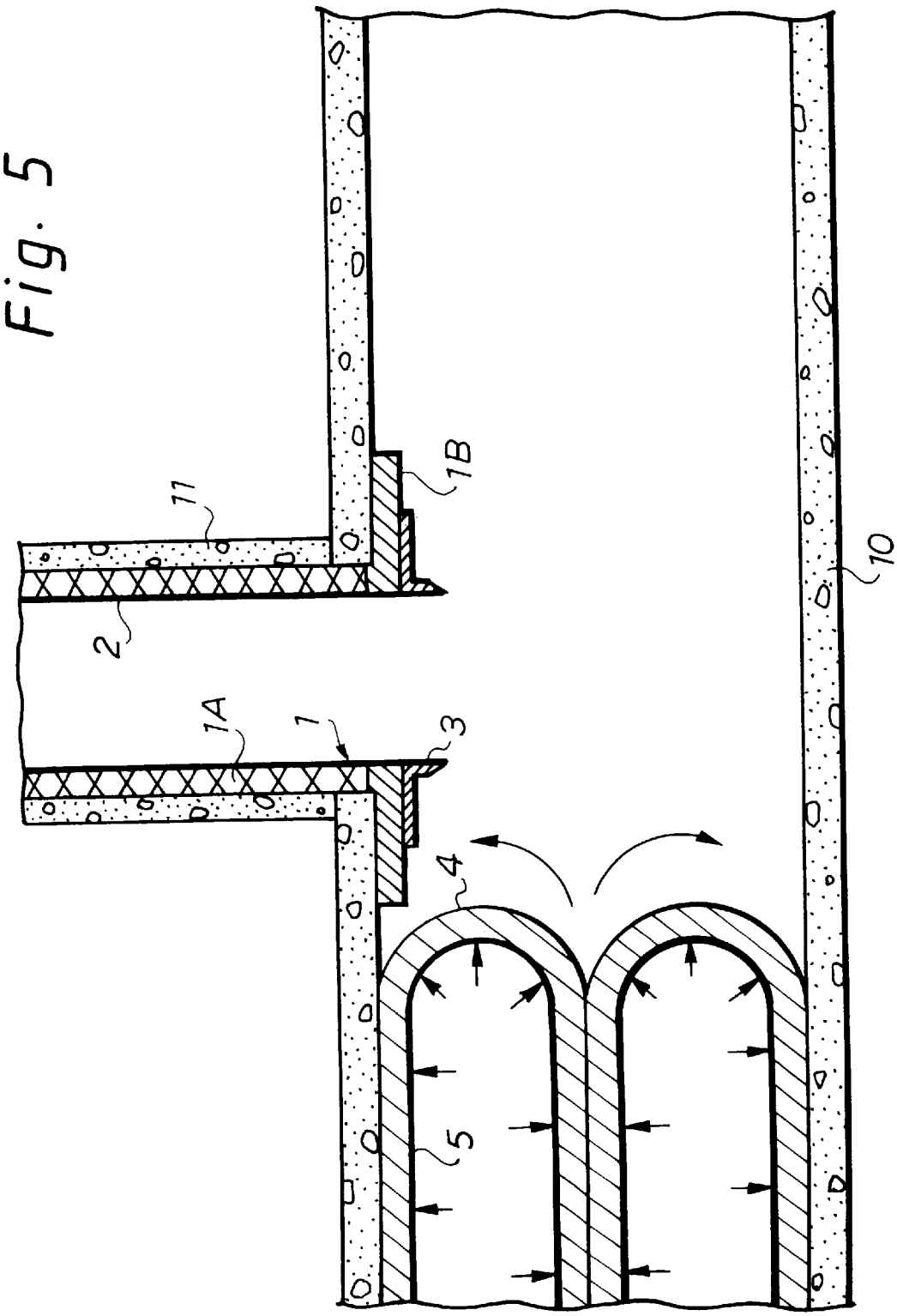

Subsequent to the completion of the lining on the inner wall of the branch pipe 11, the main pipe 10 is next lined. More specifically, as illustrated in FIG. 5, the main pipe liner bag 4 is inserted inside out into the main pipe 10 by a fluid pressure such as air pressure. In this case, the main pipe liner bag 4 is composed of a tubular resin absorbent material impregnated with unhardened liquid hardenable resin and a highly air-tight plastic film 5 coated over the outer surface of the tubular resin absorbent material. It should be noted that the plastic film 5, the tubular resin absorbent material, and the liquid hardenable resin may be similar to those used in the branch pipe liner bag 1.

Figure 6:
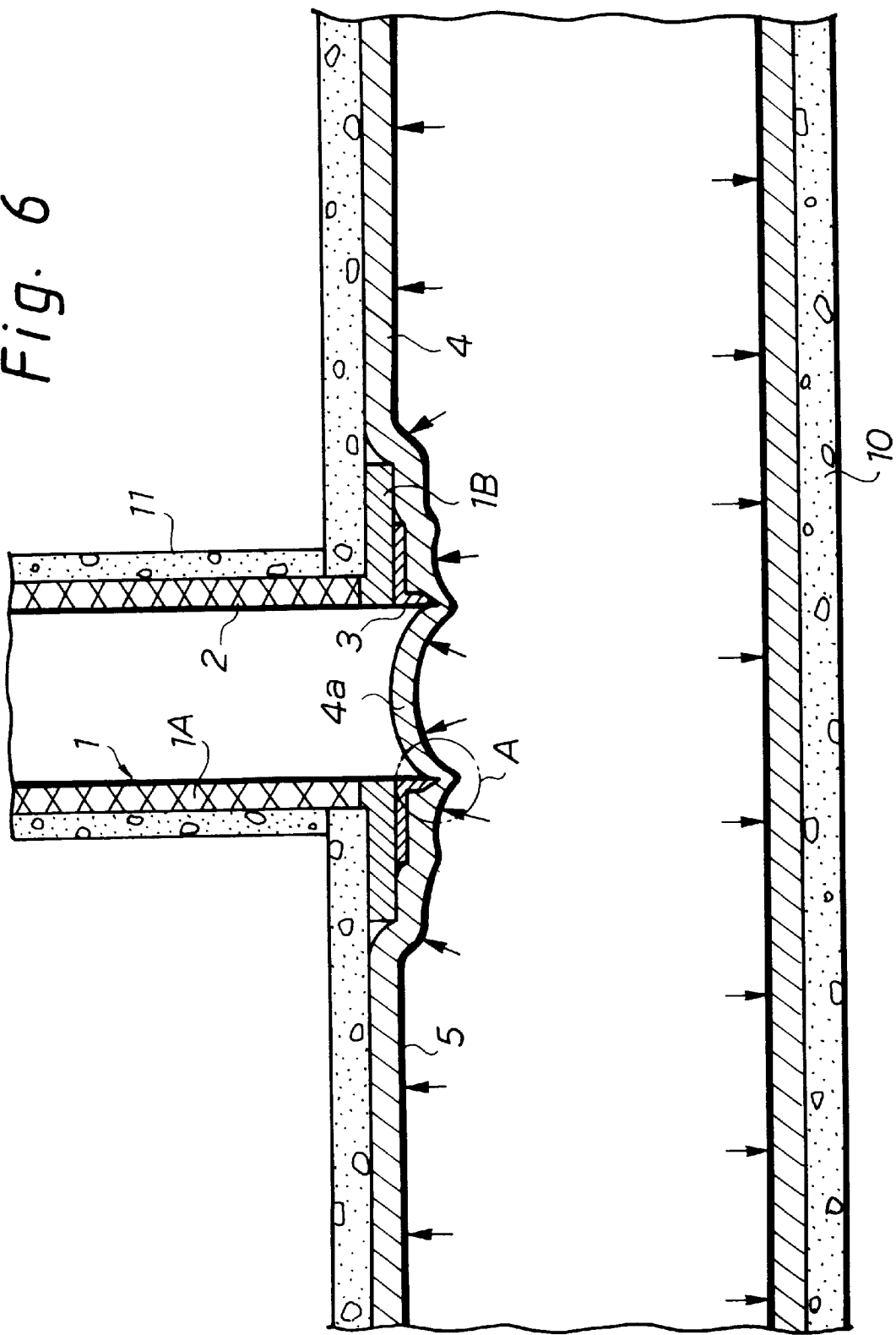

When the main pipe liner bag 4 has been inserted into the entire length of the main pipe 10 as illustrated in FIG. 6, a fluid pressure is applied to act on the inside of the main pipe liner bag 4 to press the main pipe liner bag 4 onto the inner wall of the main pipe 10. This causes the tip of the thickness reducing member 3 to come into touch with the outer peripheral surface of the main pipe liner bag 4, whereby the tip of the reduced thickness portion 3 cuts into the outer peripheral surface of the main pipe liner bag 4 as illustrated in detail in FIG. 8 to locally reduce the thickness of the main pipe liner bag 4 in that portion.

Then, the main pipe liner bag 4 is heated by an appropriate heating means with the above-mentioned state maintained, to harden the thermosetting resin impregnated in the main pipe liner bag 4, whereby the inner wall surface of the main pipe is lined or repaired by the hardened main pipe liner bag 4. In this event, since the portion of the main pipe liner bag 4 having a reduced thickness is hardened as it is, this portion has a strength lower than the remaining portion of the main pipe liner bag 4.

Figure 7:
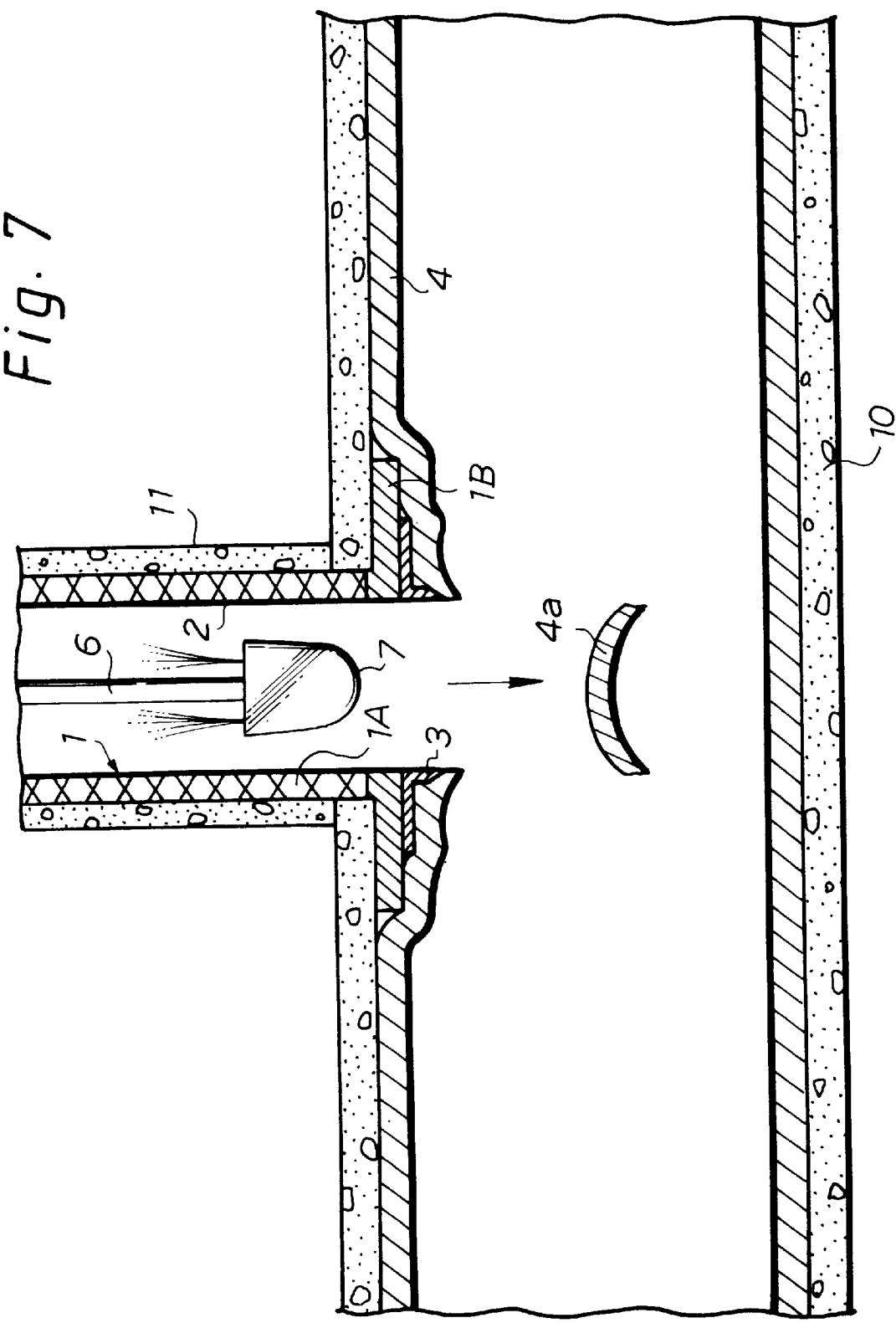
Figure 8:
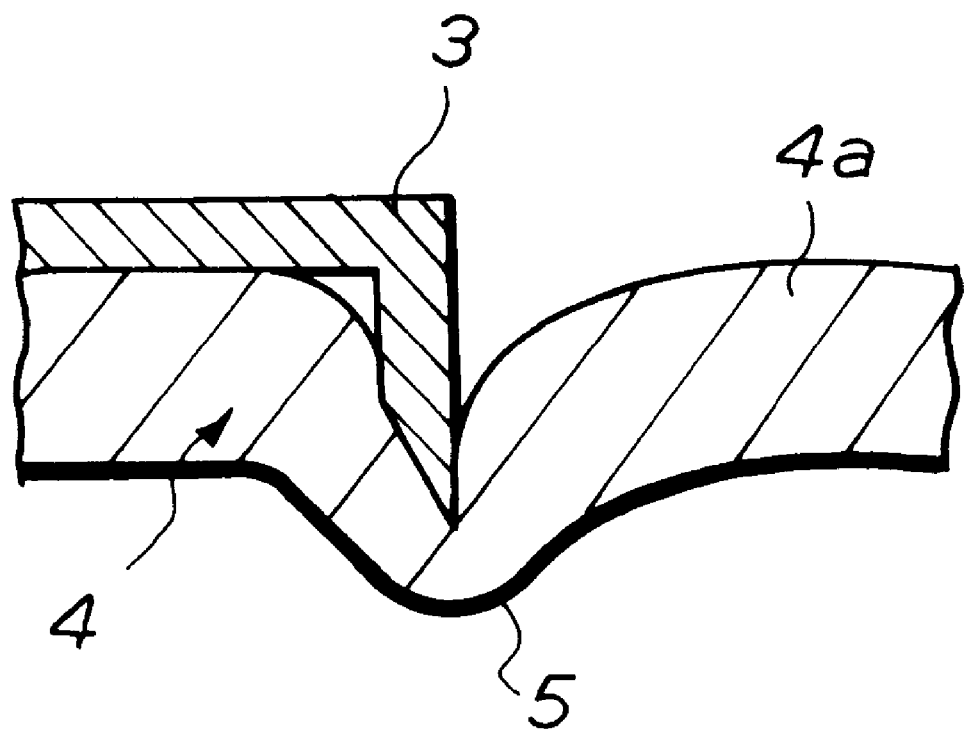
FIG. 8 is an enlarged view illustrating in detail a portion A in FIG. 6.

As illustrated in FIG. 7, a high pressure water reverse jet nozzle 7 coupled to the tip of a high water pressure hose 6 is introduced into the branch pipe 11 from the ground, high pressure water is supplied to the high water pressure hose 6 to reversely jet the supplied water from the back end of the high pressure water reverse jet nozzle 7. This causes the high pressure water reverse jet nozzle 7 to move downwardly due to a reaction force of the reversely jetted high pressure water to apply an impact to the portion 4a of the main pipe liner bag 4 blocking the branch pipe opening (surrounded by the thickness reducing member 3). Thus, a locally high stress occurs in a portion of the main pipe liner bag 4 having a reduced thickness and breaks this portion. In this way, the portion 4a of the main pipe liner bag 4 blocking the branch pipe opening is punched out in a circular shape and dropped. As a result, the branch pipe 11 opens to the main pipe 10 to communicate with each other.

As described above, according to the pipe lining method of the present invention, since the thickness reducing member 3 cuts into the outer surface of the main pipe liner bag 4 to reduce the thickness of a predetermined portion (a portion to be cut) of the main pipe liner bag 4, application of an external force to the thickness reduced portion (a portion having a strength lower than the remaining portion)

of the main pipe liner bag 4 results in breaking this portion, whereby the main pipe liner bag 4 is accurately and readily punched out along the shape of the thickness reducing member 3. It is therefore possible to accurately punch out the main pipe liner bag 4, after applied to the main pipe, with a good operability, while eliminating deteriorated operation environment and operability which would be otherwise caused by manual cutting operations using conventional cutting tools and remote operations using a robot.

It should be noted that while the foregoing embodiment employs an impact generated by the high pressure water reverse jet nozzle 7 as an external force applied to break the thickness reduced portion of the main pipe liner bag 4, fluid pressure, blast pressure, expansion force generated by frozen water, or the like may be alternatively utilized as the external force.

Also, the foregoing embodiment has been described in connection with a lining operation for lining the main pipe 10 after lining the branch pipe 11. If the main pipe liner bag 4 is formed with a hole in a portion blocking a branch pipe opening after the main pipe 10 has been lined and then the branch pipe 11 is lined, the thickness reducing member 3 may be attached around the periphery of the branch pipe opening.

Further, while the forgoing embodiment has been described in connection with a punching operation for the main pipe liner bag 4, it will be of course understood that the method according to the present invention can also be applied to cutting of a pipe liner bag if a portion of the main pipe liner bag 4 blocking the entrance or exit of the main pipe or the like is partially reduced in thickness by the thickness reducing member and is applied with an external force acting thereon to cut the main pipe liner bag 4 from that portion.

Furthermore, while the foregoing embodiment has been described in connection with a pipe lining method using a pipe liner bag comprised of a tubular resin absorbent material impregnated with an unhardened liquid hardenable resin and a highly air-tight film coated over the outer surface of the tubular resin absorbent material, the present invention may be applied similarly to a pipe lining method using a pipe liner bag including a tubular thermoplastic resin.

As will be apparent from the foregoing description, according to the present invention, since the thickness reducing member cuts into the outer surface of the pipe liner bag to reduce the thickness in a predetermined portion (a portion to be cut or punched) of the pipe liner bag, application of an external force to the thickness reduced portion (a portion having a strength lower than the remaining portion) of the main pipe liner bag results in breaking this portion, whereby the main pipe liner bag is accurately and readily cut or punched along the shape of the thickness reducing member. It is therefore possible to accurately cut or punch out the main pipe liner bag, after applied to the main pipe, with a good operability, while eliminating deteriorated operation environment and operability which would be otherwise caused by manual cutting operations using conventional cutting tools and remote operations using a robot.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A pipe lining method comprising the steps of:
    applying a fluid pressure to act on the inside of a pipe liner bag introduced in a pipe to press said pipe liner bag onto the inner wall of a pipe including a portion extending over a branch pipe opening of a branch pipe into said pipe;
    contacting a thickness reducing member extending from a periphery of a branch pipe opening into said pipe on the outer surface of said pipe liner bag to partially reduce the thickness of said pipe liner bag adjacent said thickness reducing member to form a thickness reduced portion of said pipe liner bag at said periphery of said branch pipe;
    performing a predetermined pipe lining operation with said thickness reducing member being maintained in contact with the outer surface of said pipe liner bag; and
    applying a force from said branch pipe to act on said portion of said pipe liner bag extending over said branch pipe opening to break said thickness reduced portion of said pipe liner bag.

2. A pipe lining method according to claim 1, wherein said pipe liner bag is comprised of a tubular resin absorbent material impregnated with an unhardened liquid hardenable resin and a highly air-tight film coated over the outer surface of the tubular resin absorbent material.

3. A pipe lining method according to claim 1, wherein said pipe liner bag comprises a tubular thermosetting resin.

4. A pipe lining method according to claim 1, wherein said thickness reducing member is attached to an opening of a branch pipe.

5. A pipe lining method according to claim 4, wherein said thickness reducing member is made of metal or hard plastic.

6. A pipe lining method according to claim 4, wherein said thickness reducing member is formed with a needle-like notched end.

7. A pipe lining method according to claim 4, wherein said thickness reducing member is formed with a convexo-convex end.

8. A pipe lining method according to claim 1, wherein said thickness reducing member is attached to a collar of a branch pipe liner bag.

9. A pipe lining method according to claim 8, wherein said thickness reducing member is made of metal or hard plastic.

10. A pipe lining method according to claim 1, wherein said thickness reducing member is made of metal or hard plastic.

11. A pipe lining method according to claim 10, wherein said thickness reducing member is formed with a needle-like notched end.

12. A pipe lining method according to claim 10, wherein said thickness reducing member is formed with a convexo-convex end.

13. A pipe lining method according to claim 1, wherein said thickness reducing member is formed with a needle-like notched end.

14. A pipe lining method according to claim 1, wherein said thickness reducing member is formed with a convexo-convex end.

15. A pipe lining method according to claim 1, wherein said external force applied to the thickness reduced portion of said pipe liner bag is a blast pressure.

16. A pipe lining method according to claim 1, wherein said external force applied to the thickness reduced portion of said pipe liner bag is a fluid pressure.

17. A pipe lining method according to claim 1, wherein said external force applied to the thickness reduced portion of said pipe liner bag is a volume expanding force generated by frozen water.

18. A pipe lining method according to claim 1, wherein said external force applied to the thickness reduced portion of said pipe liner bag is an impact caused by a nozzle which advances by a jetting fluid pressure.

* * * * *